Sept. 15, 1936.  L. B. BACON  2,054,212
LIQUID LEVEL INDICATOR
Filed Dec. 17, 1930  4 Sheets-Sheet 1

Inventor:-
L. B. Bacon
by Hubert E. Peck atty

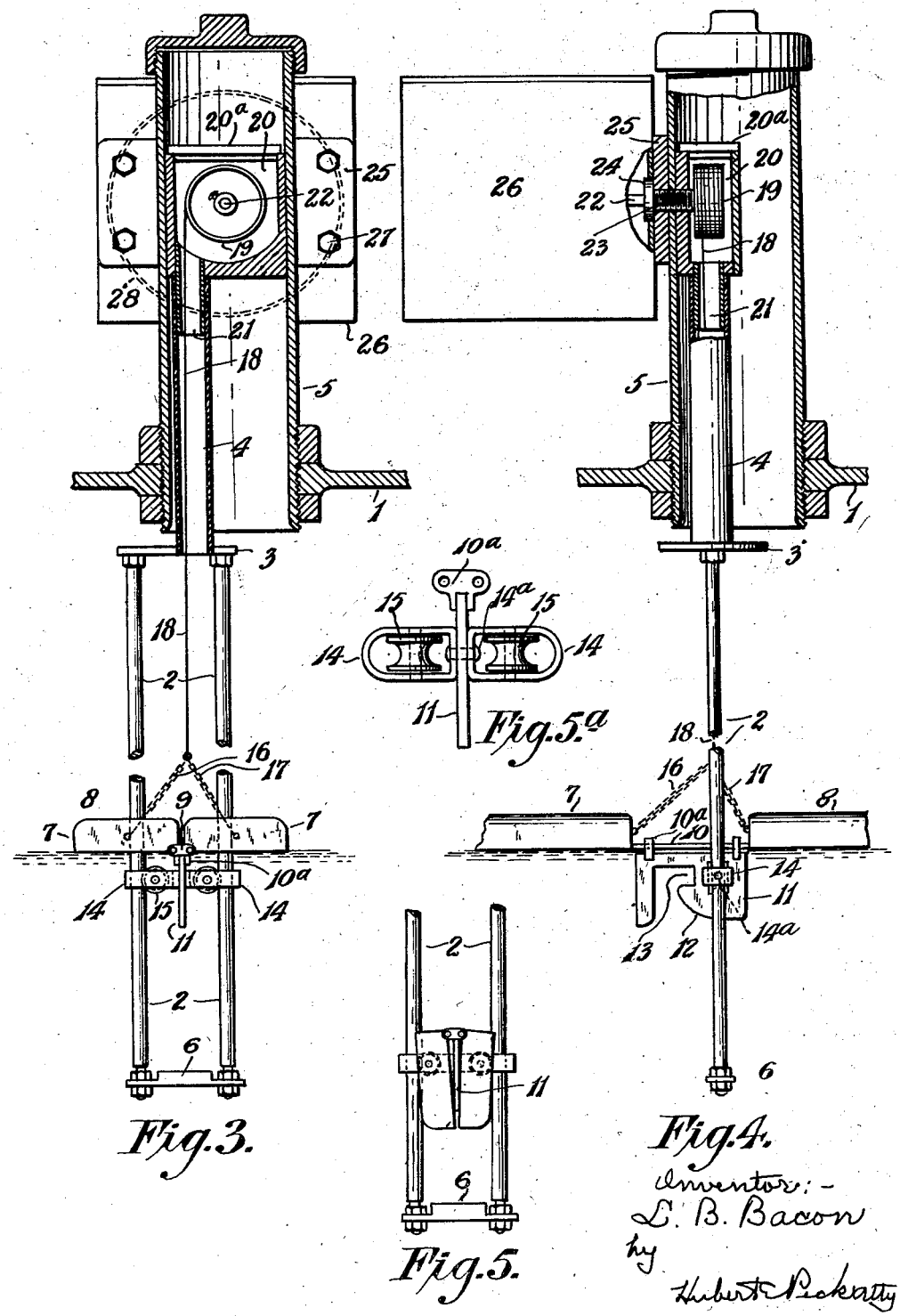

Sept. 15, 1936.　　　　L. B. BACON　　　　2,054,212
LIQUID LEVEL INDICATOR
Filed Dec. 17, 1930　　　4 Sheets-Sheet 4

Inventor:-
L. B. Bacon
by
Hubert E. Peck atty

Patented Sept. 15, 1936

2,054,212

UNITED STATES PATENT OFFICE 2,054,212

LIQUID LEVEL INDICATOR

Leonard Bernard Bacon, Stratford, Victoria, Australia

Application December 17, 1930, Serial No. 503,080
In Australia September 9, 1930

13 Claims. (Cl. 73—82)

This invention relates to liquid level indicators, and has been devised with the object of providing a simple and reliable device which will indicate the quantity of petrol or liquid pumped or drawn at intervals from such as a petrol storage tank or other reservoir or container.

This invention also enables the person in charge of such as a petrol service station to know exactly what quantities of petrol or oil are being sold and also the quantity remaining in the petrol tank.

The main feature of this invention resides in the fact that the measurements of the petrol or liquid displacement in the tank are accurate to a degree and depend upon the principle of petrol or liquid level governing the descension of a float and whereby the effect of the movement of the float is greatly augmented or increased by means which will be hereinafter described.

This principle is not affected by the different specific gravities of the petrol, petrol mixture or oil and is different from the usual method whereby the pressure of the petrol or oil is utilized to find the quantities taken from the tank, but owing to the different grades of petrol invariably employed is subjected to different pressures with the result that equal volumes of petrol, oil, or liquids having different specific gravities give different readings. A further defect occurs in that the gear usually employed results in a reduced movement of the indicator, whereas in my invention even when a very small quantity of liquid is removed from the tank the displacement of the float due to the receding level of the liquid can be increased or multiplied indefinitely, and in this instance by increasing the diameter of a calibrated drum from which the readings are taken. Briefly, the embodiment of the invention illustrated as an example, includes a hollow collapsible metal float which rides upon the surface of the liquid within the tank and is suspended from a fine metal wire which is attached to a grooved pulley. This pulley is mounted upon the inner end of a spring controlled shaft which also carries a drum on the cylindrical surface of which is a calibrated spiral. A spur pinion is mounted upon said shaft which pinion when the float is descending drives a gear train which both rotates a horizontally disposed screw and winds up a spring. Mounted upon said screw is a movable mask which is positioned on the top of or aside of the calibrated drum. The said screw which is restrained against longitudinal movement revolves in unison with the said drum so that the mask is always opposite to the correct part of the spiral and cannot get out of register with such. Thus when a number denoting such as gallons or other quantities is brought under the mask a reading can be quickly and easily taken.

A further feature of this invention relates to the automatic coiling of the float suspension spring upon its pulley when the tank is empty and needs replenishing with petrol or other liquid. This is accomplished by means of the aforesaid gear train which winds up the controlling spring, said spring always keeping the float wire at a tension whether the float is descending or ascending, and should the tank be empty or being filled with liquid the spring begins to unwind and reverses the rotary movement of the drum shaft through the intervention of the said gear train, and the pulley on said shaft winds the suspension wire upon itself. Also the said expanding spring reverses the rotary movement of the said restrained screw and the mask travels in the reverse direction along the screw till it reaches the zero mark on the drum which has likewise rotated.

A further and important feature of this invention relates to means for removing a collapsible float through the dip tube.

Referring to the drawings,

Fig. 3 is a side elevation in part section, and

Fig. 4 is a front part sectional elevation, of the device.

Fig. 5 is an end elevation of the float shown collapsed.

Fig. 5a is a detail of Fig. 5.

Figure 1:
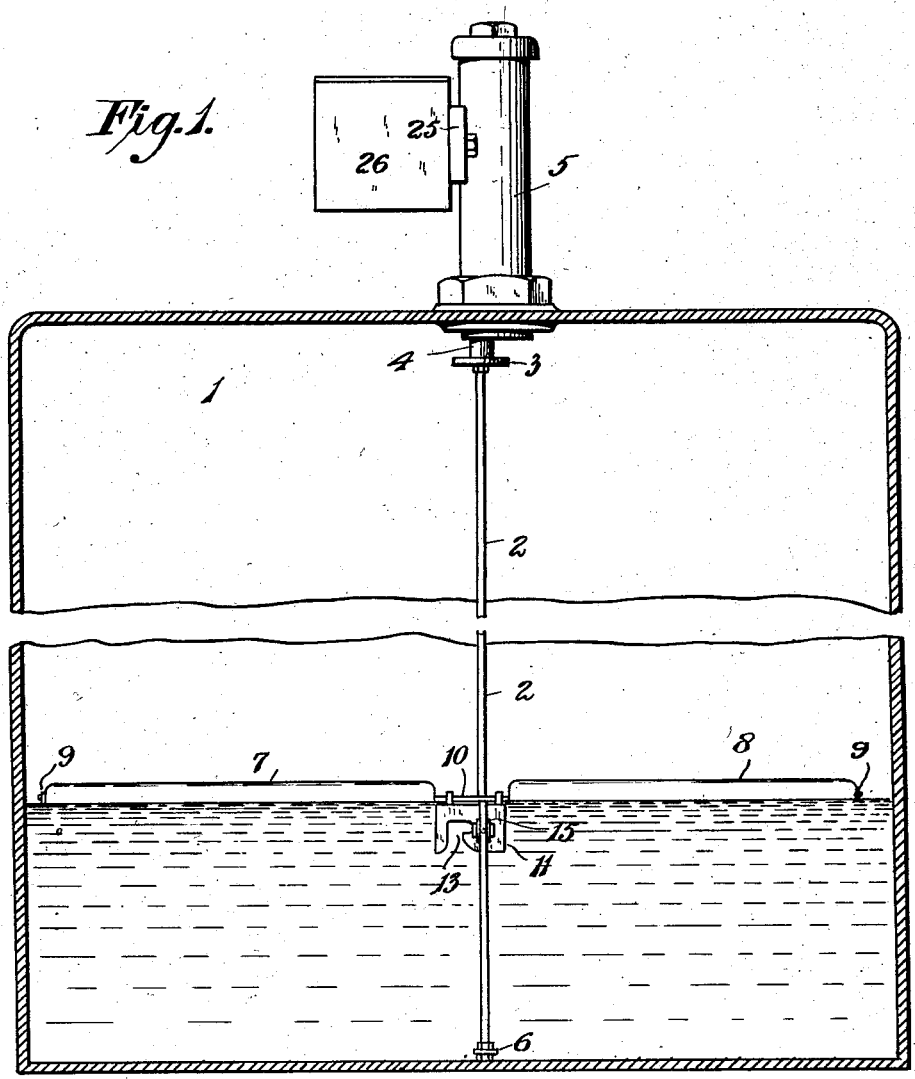
Fig. 1 is a front elevation of the device as applied to a petrol storage tank.
Figure 2:
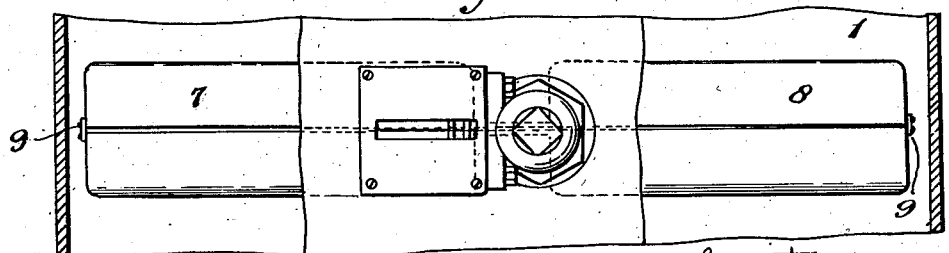
Fig. 2 is a part plan of Fig. 1.

In the said drawings the reference numeral 1 indicates a petrol storage tank which may be of the usual holding capacity of say 500 gallons. 2 denotes a pair of vertically disposed guide rods the upper ends of which are threaded for engagement with tapped holes in a hollow plate or flange 3 mounted upon the end of a depending guide pipe 4.

The said pipe 4 is housed in the dip tube 5 and aside of the centre thereof to leave a comparatively large space or area for the removal of a float therethrough. The lower ends of the said guide rods are secured to a cross bar 6 as illustrated.

The numerals 7—8 represent a collapsible float, one part 7 of said float being longer than the other in order that its additional weight will make it tilt downwards from the normal and horizontal position to the vertical so that the whole float can be drawn up and through the dip tube 5 should the float leak or have to be repaired.

The float members are made hollow and preferably of brass and of the shape shown in the drawings and are adapted to float upon the surface of the liquid in the storage tank 1.

Also in order to reduce the width of the float 7—8 for the convenient removal through the dip tube 5 each part 7 and 8 is made in two longitudinal sections hinged together at their outer ends at 9.

Each opposing pair of float sections is connected together by means of a rod 10 the ends of which are soldered or welded to the inner and lower corners thereof, thus providing two spaced and parallel rods which support a pair of spaced holed lugs 10ᵃ, the depending ends of which are bifurcated to be attached by a pin or the like to a depending tipping plate 11 which latter is formed with a curved or cam edge 12 and also with a recess 13 as and for the purpose hereinafter described.

14 represents a pair of brackets supported upon the ends of a pin 14ᵃ upon which pin the tipping plate 11 is free to pivot. 15 is a pair of pulleys supported in the said brackets. 16 represent a pair of chains attached at their lower ends to the two float sections 7, and 17 are a pair of chains similarly connected at their lower ends to the float sections 8.

The upper ends of the said chains 16, 17 are attached to a suspension wire 18 preferably made of spring steel, which passes up through the pipe 4 and through an inner and concentrically mounted tube 21 into a pulley housing 20 and is then connected to a grooved pulley 19. The tube 21 is secured to and depends from the housing 20 and acts as a support for the upper end of the guide pipe 4.

Figure 8:
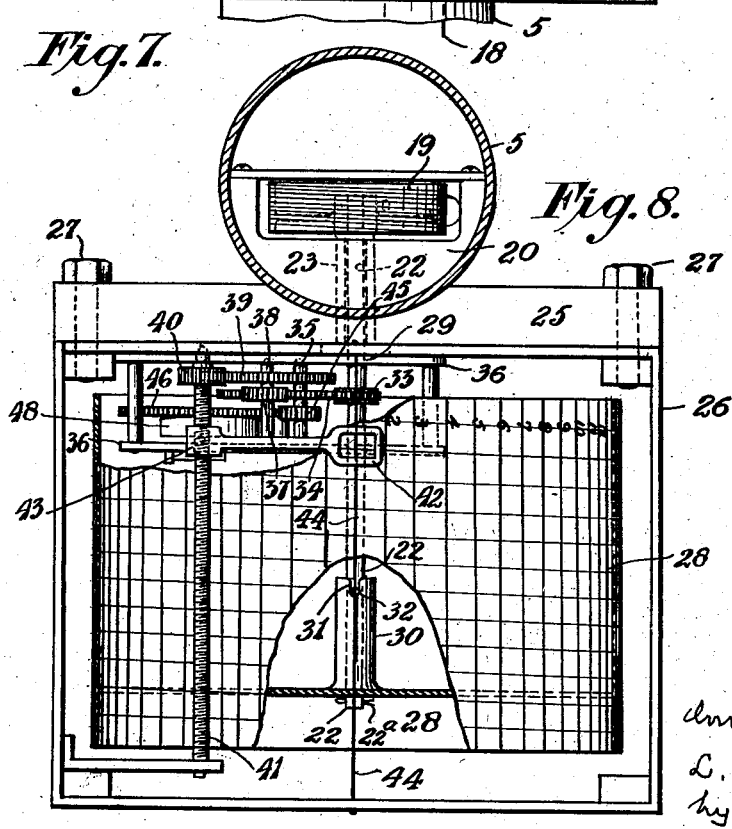
Fig. 8 is a plan of Fig. 7.

The said pulley housing 20 is open at one side and its open top is closed by a removable cap 20ᵃ and extends across one half of the dip tube as shown in Fig. 8. A portion of the base of the housing 20 contains oil to provide an oil bath for the suspension wire 18, especially should water be the liquid in the tank. The pulley 19 is mounted on the inner end of a horizontal drum shaft 22 which passes freely through a hollow screw 23, the outer end of which is formed with a collar 24 to enable said screw to be conveniently screwed into and unscrewed from an internally threaded bore formed in the pulley housing 20, the dip tube 5 and a plate 25 which by means of set screws 27 is secured to and supports a drum box 26 which latter houses a calibrated drum 28.

The drum shaft 22 is suitably supported in a bearing 29 in a gear casing 36 and the drum 28 is furnished with a sleeve formed with a recess 31 for engagement by a pin 32 carried in the shaft 22, the drum being retained in position upon the said shaft by means of a split pin 22ᵃ. Upon the said drum shaft is mounted a spur pinion 33 which meshes with a spur wheel 34 mounted upon a shaft 35 supported in bearings 29 in a gear casing 36. The spur wheel 34 meshes in turn with a spur pinion 37 mounted upon a shaft 38 which also carries a spur wheel 39 which gears with a pinion 40 mounted on the outer end of screw 41. 42 is a mask the inner end of which is formed into a nut 43 which travels along the screw and the latter revolves in unison with the drum, the screw making more revolutions than the drum in the same time so that the mask will always be in register with the correct part of a spiral curve on said drum.

A piece of fine wire 44 is secured to the ends of the drum box and passes through the said mask and through the longitudinal centre thereof. A spiral curve is marked or traced upon the surface of the drum and which spiral carries a series of equidistantly spaced numerals each of which denotes some quantity such as a number of gallons or the like, and depending upon the nature of the contents in the tank. In measuring such as petrol or oil the numerals would denote gallons. The mask and the drum are so arranged in relation to each other that when a particular numeral is brought directly under the mask and under the fine wire 44 this numeral indicates the quantity of petrol or liquid which has been removed from the tank.

The descension of the float 7—8 is employed to wind up a spring 48 as follows. Upon the shaft 35 a spur pinion 45 is mounted and which meshes with a gear wheel 46 freely mounted upon a rigid or immovable shaft 47 supported in the said gear casing 36. One end of the spring is attached to the gear wheel 46 and the other end of the spring is suitably anchored to the said gear casing and which spring is wound when the drum shaft 22 rotates due to the descension of the float and the unwinding of the suspension wire from the pulley 19.

When the tank is being replenished with petrol or liquid the float ascends and the spring 48 uncoils and reverses the rotary movement of the drum shaft 22 and thus winds the suspension wire thereon, the unwinding and winding of the wire 18 on the pulley being repeated as the petrol or liquid is removed from and is being replenished in the tank.

In order to remove the float 7—8 out of the tank and through the dip tube 5, the set screws 27 are unscrewed from the drum box 26, and the pulley 19 is removed from the shaft 22. Also the hollow screw 23 is removed from its threaded bore thus permitting the pulley housing 20 with the pulley 19 therein to be raised out of the dip-tube and also the float by the following procedure.

Figure 6:
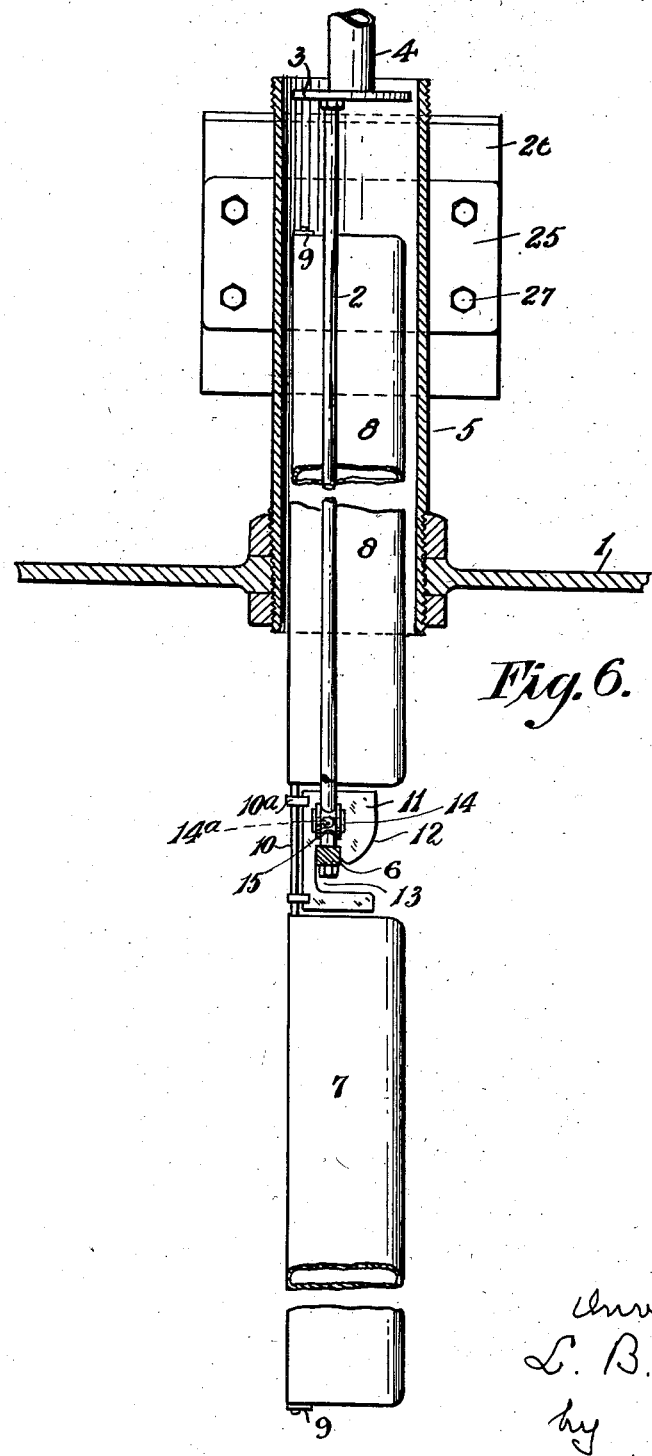
Fig. 6 is a vertical section of the device showing the two part float in a position to be removed from the dip tube.

Upon raising the pulley housing 20 the suspension wire 18 becomes slack and the float sections 7, 7, and 8, 8, being unsupported collapse and assume the position shown in Fig. 5. The float is then raised above the level of the liquid in the tank and the bar 6 which connects the lower ends of the guide rods 2 together strikes the cam or curved surface 12 of the tipping plate 11 which pivots or swivels upon the pin 14ᵃ and describes an arc of 180 degrees or is brought from the horizontal to a vertical position. In such position the said bar 6 engages a recess 13 in the plate 11 and is retained therein as shown clearly in Fig. 6. As the said plate 11 is attached to the float 7—8 the latter also describes a semicircular path from the horizontal to the vertical, and which tilting of the float is also brought about by having one of the float sections, namely 7, 7, longer than the other float section 8 with the result that the longer and heavier float descends first and when in the vertical position it lies underneath the float sections 8.

When this happens it will be understood that the float can be easily and conveniently removed from the dip tube for repairs.

It will also be understood that the smallest float movement will cause rotary movement of the calibrated drum and that a reading can easily be taken and which is of especial use in such as motor service stations where a considerable amount of waste occurs and which the proprietors have to pay for.

It will be understood that one of the main features of this invention is the use of a calibrated spiral curve upon the cylindrical surface of the said drum, and which is a great advance in the method of marking a series of numbers or calibrations upon a closed or circumferential curve which limits the readings to one rotation of the drum, whereas by employing a spiral curve the whole surface of the drum can be utilized, that is the readings can be taken from end to end of the drum, and if the drum is of considerable length, numerous readings can be taken.

In the device illustrated the drum is about four inches in diameter and approximately four inches in length, and which has been found sufficient to give readings when employed in conjunction with a tank or receptacle containing approximately 500 gallons of petrol or liquid.

The drum shaft being controlled by a spring ensures that same will have a steady and uniform rotary movement and that the wire supporting the float will always be kept at a tension, and consequently never becomes slack, especially as the pulley 19 is threaded or grooved in the form of a thread or spiral thus ensuring that the wire will always be retained in said thread.

The gear train described herein and illustrated in the drawings may be altered to suit circumstances, and the rotatable screw 41 illustrated herein revolves about eight times to each revolution of the drum 28, though this ratio may be altered depending upon the diameter of the drum and other considerations.

The principle of employing a calibrated spiral on a drum can be used in tanks or containers without dip tubes and where there is a large enough opening to extract an ordinary float.

By increasing the diameter of the drum more exact readings can be taken and the diameter of said drum may be of any length suitable for a particular purpose.

Figure 7:
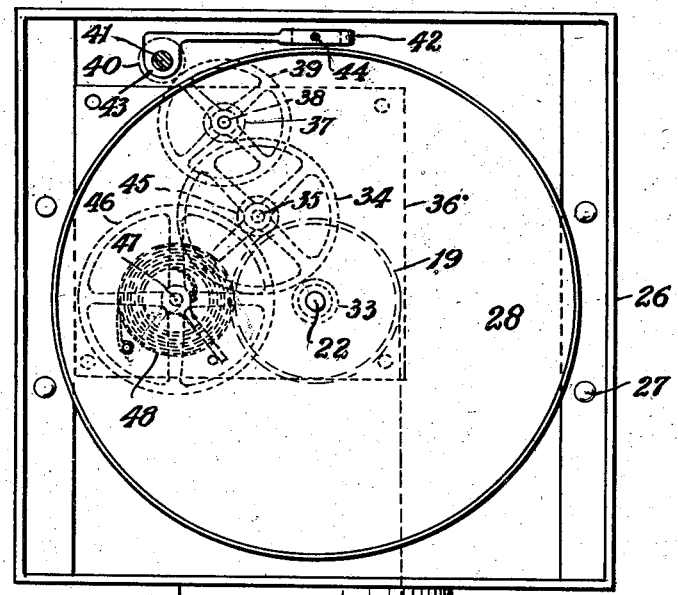
Fig. 7 is an end elevation of the indicator drum showing the gear train therein.

In the illustrated specific example of one embodiment of the invention, and without intending to so limit the invention, any suitable "indicator", is indicated generally in Figs. 1 and 4, by the reference letter 26, while for one specific form of "indicator", see Figs. 7 and 8, wherein a box 26, encloses indicating means, such as mask 42, and a spirally marked rotary drum 28, and suitable actuating means including actuating shaft 22, and rotary pulley 19, removably coupled to said shaft to actuate the same. Either said pulley or said shaft, or the two together constitute a "rotary member". Whether or not tube 5, constitutes a "dip tube", and whether or not tube 5, is supported by container 1, such tube opens into container 1, by means of an opening in said container, and in this particular example, forms the major "support" for the tubular exteriorly threaded stud 23, which stud forms a "support" for the indicator 26, and for the "box" or pulley housing 20, which "box" 20, forms a portion of the "support" or "carrying member" for the guide 2, for the float device 7, 8. The tube 4, in this example, fixed to box 20, and removable through tube 5, with the guide 2, and float device, forms the direct "support", "carrier", or "carrying member" for guide 2, and the float device.

I claim:

1. In combination; a rotary member; an indicator actuated thereby; a liquid container having a passage opening thereinto; a carrier vertically removable through said passage and provided with a vertically elongated guide depending in the container; a group of pivotally connected floats mounted as a unit on said guide to move vertically thereon, said floats being collapsible as a group to reduce the transverse dimensions of the group for free movement through said passage; and power transmitting means attached to said floats and passing upwardly along said guide carrier to said rotary member to actuate the same.

2. In combination, an indicator; a liquid container having a passage thereinto, a float guide and carrier; means removably supporting said guide and carrier depending from said passage into said container; a group of pivotally joined and vertically swingable floats confined to and vertically movable as a group on said guide and carrier; cooperative means associated with said floats and said guide and carrier for shifting the positions of said floats to contract the transverse dimensions of the group of floats for free movement through said passage, said guide and carrier with the group of floats carried thereby being removable vertically through said passage; and indicator operating means from the floats to said indicator.

3. In combination; a liquid container having an opening; a support above said opening; an indicator having a supporting box secured to said support, said indicator including an operating shaft; a float guide depending in said container and provided with a float vertically movable with respect thereto, said guide provided with a carrying member in said opening and removably fixed to said support; an indicator actuating pulley normally mounted on and having separable operating connection with said indicator shaft; and a flexible pulley operating connection from said float to said pulley and extending upwardly through said opening and along said member.

4. In combination, in a liquid level indicating apparatus, a dip tube, a carrier provided with depending float guide means adapted to be inserted into a liquid container and depend therein from the dip tube of said container with the carrier removably secured in said tube; float means confined to and vertically movable on said guide means and removable therewith through said tube; an indicator including a rotary actuating member arranged transversely of the tube interior; means for supporting said indicator exteriorly of and beside said tube; an operating connection from said float means to said rotary member for actuating the same by the downward movement of the float, and mechanism acting on said member to take up the slack of said connection on the upward movement of the float means.

5. In combination, in a liquid level indicating apparatus; a liquid container; an upstanding tube opening thereinto; a carrier normally secured in said tube and providing a pulley housing; float guide means depending from said carrier into said container; float means vertically movable on said guide means; an indicator provided with an actuating pulley separable therefrom and arranged in said housing; and an actuating connection associated with said pulley and guided by said carrier and coupled to said float means for actuation thereby, whereby said carrier and said parts carried thereby are applicable to and removable from said container through said tube.

6. In combination; an indicator, a tank having a dip tube, a member provided with vertically disposed guide rods extending downwardly therefrom into the tank, floats mounted on said guide rods for vertical and pivotal movement thereon, means attached to said floats and passing upwardly into said tube and operatively associated with said indicator for actuating the same, and coacting means on the guide rods and floats for positioning said floats for vertical removal from the tank through said dip tube, said member with the guide rods and floats being removable vertically through said tube.

7. In combination, an indicator, a tank, a dip tube, a pipe housed therein, vertically disposed guide rods secured thereto and extending downwardly into said tank, groups of floats slidably mounted on said guide rods for vertical movement thereon, and means attached to said floats and passing upwardly through said pipe and operatively associated with said indicator for actuating the same, the floats of each group being hingedly coupled to each other and collapsible as a group to reduce the transverse dimensions of the groups for passage through said dip tube.

8. In combination, an indicator, a tank having a dip tube, vertically disposed guide means extending downwardly into said tank from said tube and provided with a support, opposing spaced groups of floats operatively associated with said indicator for actuating the same, each group being pivotally and slidably mounted on said guide means for vertical and pivotal movement thereon, the floats of each group being hingedly coupled for folding, and coacting means on the guide means and float groups whereby the floats are brought to vertical position parallel to said guide means for their removal from the tank.

9. In combination, an indicator; a liquid container having an opening; a pulley operatively associated with said indicator for actuating the latter; a carrier having float guide means secured thereto and extending downwardly into said tank and removable with said carrier through said opening; opposing sets of spaced float members pivotally mounted on said guide means for vertical and pivotal movement thereon, the members of each set of floats being hingedly coupled together for folding; coacting means between said guide means and said float members for folding the same for passage through said opening; and pulley actuating means suspended through said opening from said pulley and attached to said float sets.

10. In combination; a liquid level indicator having an actuating pulley; a support having float guide means adapted to extend downwardly in a liquid container and vertically removable therefrom through a top opening into said container; opposing sets of spaced rigidly connected float members pivotally mounted on said guide means for vertical and pivotal movement thereon, the members of each set of floats being hingedly coupled together for folding; and means for positioning said floats for removal from the container, comprising a flexible connection between said pulley and each set of floats, and means on said opposing sets of floats and on said guide means whereby said floats are swung to vertical position while the floats of each set of floats are in folded position.

11. In combination; an indicator; a tank; a dip tube secured to said tank having a pulley and pulley housing therein, said pulley operatively associated with said indicator for actuating the latter, a pipe secured to the housing, a pair of vertically disposed guide rods secured to said pipe and extending downwardly therefrom into the tank, float means confined to and movable vertically on said rods; and a flexible connection from said float means extending upwardly through said pipe to said pulley and operated by the float means to operate the pulley, said pulley housing, pipe, guide rods, and float means as a unit, being applicable to and removable from said tank through said tube.

12. In combination, a liquid level indicator; a liquid container; float guide means depending in said container and vertically removable therefrom; sets of spaced floats confined to said guide means for vertical and pivotal movement thereon, the floats of each set being pivotally coupled together; a cam and locking member on said floats; a cam actuating member on the guide means, whereby said floats are swung to vertical position for removal from said container; and a flexible connection for operating said indicator, coupled to said floats.

13. In combination, a tank having a dip tube; an indicator; a carrier removably housed within said dip tube having vertically disposed guide means extending downwardly therefrom into the tank; sets of floats pivotally mounted on said guide means for folding and suspended by means operatively associated with said indicator for actuating the same, the floats of one set being of greater length than those of the opposing set for tilting the sets to vertical positions when folded, for passage through said tube; and means on the floats and guide means for positioning said floats for removal from the tank.

LEONARD BERNARD BACON.